May 25, 1943. H. S. JANDUS 2,319,931
AUTOMOBILE WHEEL LOCKING ASSEMBLY
Filed April 4, 1942 2 Sheets-Sheet 1

Inventor
HERBERT S. JANDUS.

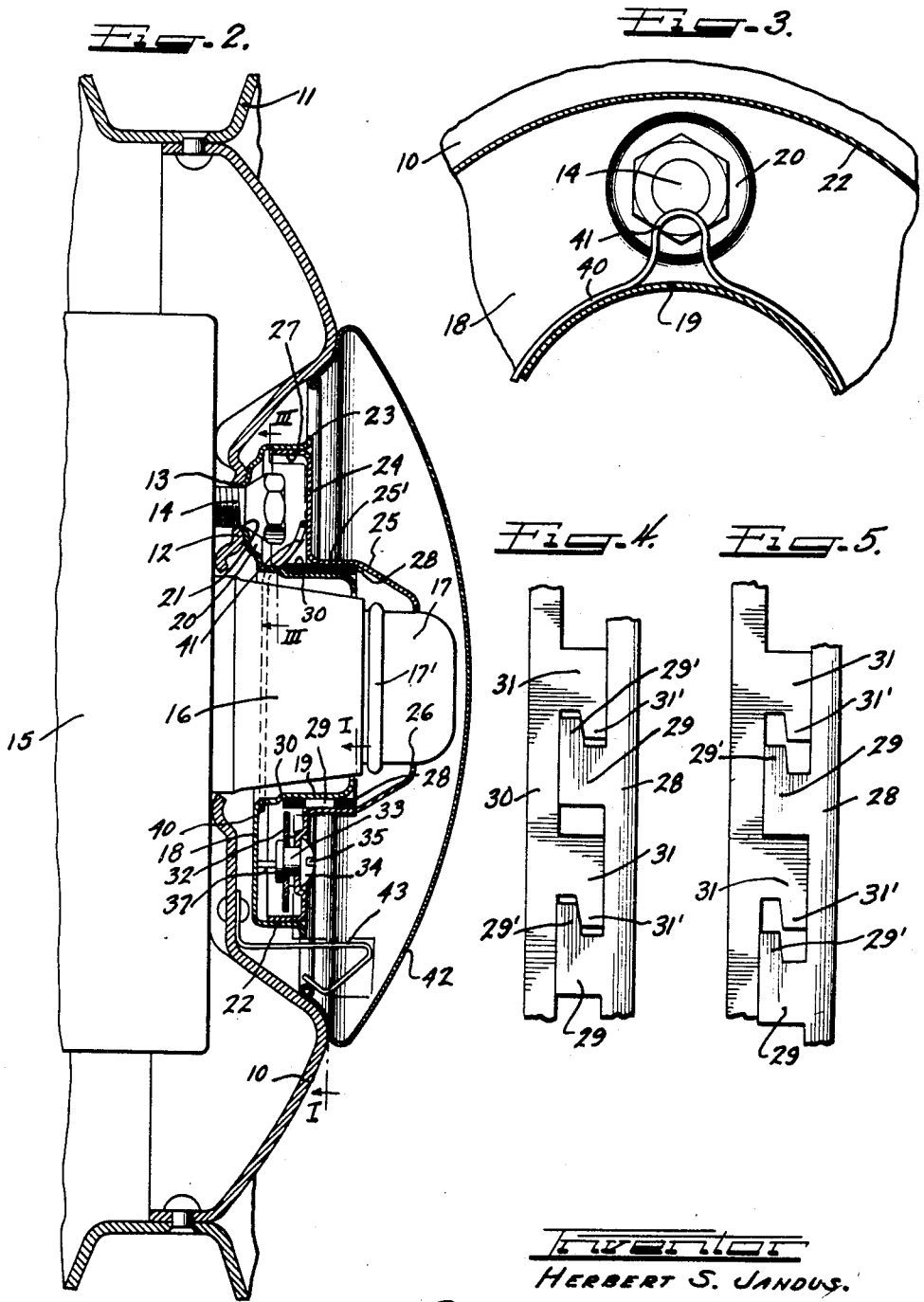

Patented May 25, 1943

2,319,931

UNITED STATES PATENT OFFICE 2,319,931

AUTOMOBILE WHEEL LOCKING ASSEMBLY

Herbert S. Jandus, Detroit, Mich., assignor to Houdaille-Hershey Corporation, Detroit, Mich., a corporation of Michigan Application April 4, 1942, Serial No. 437,625

6 Claims. (Cl. 70—259)

This invention relates to the locking of automobile wheels for frustrating removal of a wheel from its supporting hub structure or removal of the entire hub structure and wheel from the wheel supporting bearing spindle.

An important object of the invention is to provide a locking assembly comprising an inner or keeper element which may be secured to the wheel by the same bolts which secure the wheel to its supporting hub, and an outer or locking cover element, together with improved means for interlocking said elements together to form an enclosure for the wheel securing bolts and the end of the wheel hub so as to prevent access to the bolts for removal of the wheel from its hub structure or access to the spindle bolt for removal of the hub structure and wheel from the spindle.

A further object is to provide interlocking means between the keeper and locking cover elements adapted upon slight rotational movement of the locking cover element to lock this element securely to the keeper element, together with lock means, preferably of the commutation or combination type, for locking the locking cover element against reverse rotation and release of the interlocking means.

Still another object is to form the keeper and locking cover elements of sheet metal and with deep peripheral flanges for stiffening the elements, and with the flanges intimately telescopically engaging so as to frustrate distortion by the use of prying levers or other tools and separation of the locking cover element from the keeper element.

In general, the object of the invention is to produce an efficient locking assembly for application to an automobile wheel, with the assembly elements themselves stiffened and strengthened against distortion and interconnected and so arranged relative to the wheel that application of prying instruments will be frustrated.

The various features of the invention are incorporated in the structure shown on the drawings, in which drawings:

Figure 2 is a section on plane II—II of Figure 1;

Figure 3 is an enlarged view on plane III—III of Figure 2;

Figure 4 is an enlarged flat development of a portion of the interengaging locking rings secured respectively to the keeper element and the locking cover element, and showing the rings in locking position; and Figure 5 is the same as Figure 4, except with the rings in unlocking position.

Figure 1:
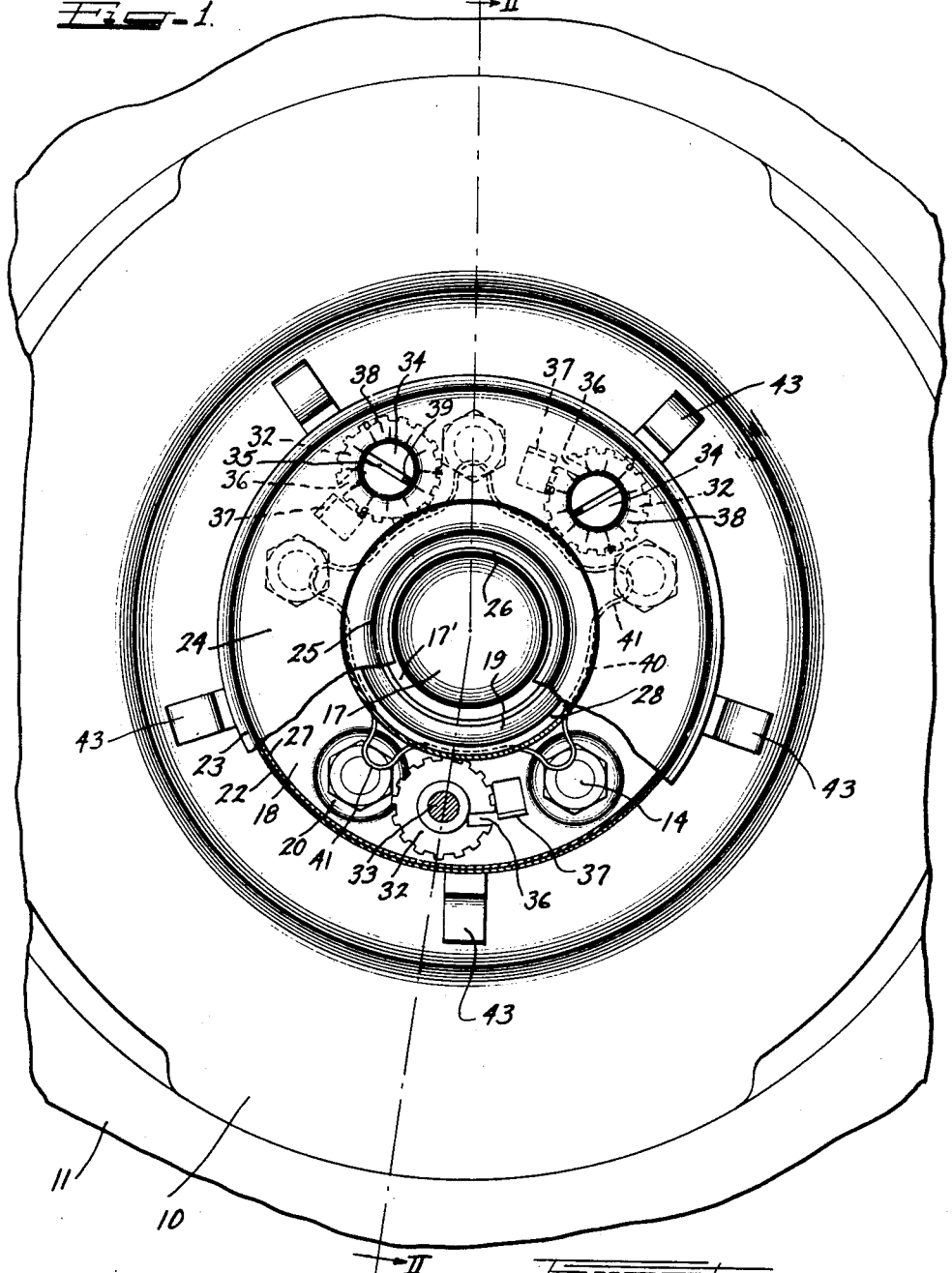
Figure 1 is a front elevation of the central portion of a wheel structure, partly in section on plane I—I of Figure 2, and showing my improved locking assembly applied thereto.

The wheel structure shown comprises the wheel disk 10 which supports a rim 11 for mounting of a tire (not shown). The inner portion of the disk 10 is deflected inwardly to provide an annular flange 12 having the holes 13 therethrough for receiving the bolt structures 14 which secure the wheel to the brake drum 15 forming part of the hub 16 which at its outer end receives a cap or grease cup 17.

The locking assembly shown comprises the keeper element 18 formed integral of sheet metal and whose central portion is deflected outwardly to form the annular wall or flange 19 surrounding the hub 16. At its outer portion the keeper element is deflected inwardly to form recesses 20, where holes 21 are provided for receiving the bolt structures 14 so that these bolt structures will secure the keeper elements together with the wheel disk to the brake drum. Around its peripheral portion the keeper element has the outwardly extending comparatively wide flange 22 terminating in an outwardly directed strengthening lip 23.

The locking cover element 24 of sheet metal has the central outwardly deflected portion 25 having the opening 26 in its front wall for receiving the grease cup 17. The cover element has the rearwardly extending peripheral flange 27, comparatively wide, and of an outer diameter to telescope snugly into the flange 22 of the keeper element 18, the rear portion 25' of the deflected portion 25 being cylindrical and spaced a distance away from the cylindrical flange 19 on the keeper element.

The means for interlocking the cover element 24 with the keeper element comprises a ring 28 on the cover element having L-shaped rearward extensions or tongues 29 at regular intervals, and a ring 30 on the keeper element having L-shaped forward extensions or tongues 31 at regular intervals. The ring 28 is secured against the inner side of the cylindrical part 25' of the deflected portion 25 of the locking cover element, and the ring 30 is secured against the outer side of the flange 19 on the keeper element as shown on Figure 2, the rings being preferably secured as by spot welding. The cover element is first applied axially to the flange 19 of the keeper element, with the extensions 29 thereon in alignment with the spaces between the forward end of the extensions 31 on the ring 30 of the keeper element and then by a rotational movement of the cover element the ends 29' of the extensions 29 will be brought into position behind the ends 31' of the extensions 31, as illustrated on Figures 4 and 5. The engaging edges of the ends 29' and 31' are inclined so that the rotational movement of the cover element will cause the rings to be drawn axially together. Upon application of the cover element its peripheral flange 27 will telescope snugly into the peripheral flange 22 of the keeper element 18. For releasing the cover element from the keeper element, it is given a reverse rotation for disconnection of the ends 29' and 31' of the rings, and then axial outward movement for separation from the keeper element.

For locking the cover element against reverse rotation after its interlocking engagement with the keeper element, suitable lock structure, preferably of the commutation type, is provided. One or more of these lock structures may be provided, three being shown. Each lock structure comprises a lock disk 32 at the rear side of the locking cover element 24, and secured to a pin 33 terminating in front of the locking cover in a head 34 which may be provided with a cross slot 35 for receiving a screw driver or other tool. The disk 32 of each lock structure has a notch or slot 36 for receiving a lock tongue 37 extending forwardly from the keeper element 18. The lock tongues may be formed by deflecting portions of the keeper element forwardly. The lock disks and the lock tongues are located substantially in the circle of the wheel bolt structures 14 and relative to the interlocking rings 28 and 30 so that, when the cover element is applied axially to the keeper element and then rotated for interlock of the interlocking rings, the lock structure disks 32 will be entirely at one side of their respective lock tongues 37, as shown on Figure 1. Now, if the lock disks are turned to displace their slots 36 from the lock tongues, these tongues will be opposed to the edges of the disks so as to prevent reverse turning of the locking cover element, and the interlocking rings will be held in their interlocking engagement shown on Figure 4. Before the cover element can be released for reverse movement to break the interlock of the rings, each of the lock disks 32 must be rotated to bring its slot 36 into registration with the respective lock tongue 37. Figure 1 shows the lock disks in such setting, and the turning of the disks to such unlocking setting is guided by combination indication marks 38 on the outer face of the cover element, the slots 35 on the heads of the lock disk supporting pins being pointed at one end, as indicated by 39, for cooperation with the combination or dial indications. After the locking cover element has been applied to and interlocked with the keeper element and so held by the tongues 37, a person knowing the proper combination can then turn the lock structure disks for registration of their slots with the tongues for reverse rotation of the cover element and removal thereof from the keeper structure.

To prevent rattling of the locking assembly parts, an annular spring 40 is provided to seat against the keeper element and has arms 41 extending forwardly for engagement by the locking cover element when in its locking position. As shown, the spring may be a length of spring wire bent to annular form and deflected to form the arms or loops 41 engaged by the locking cover element.

In my improved locking cover assembly, the interlocking rings 28 and 30 are close to the hub and away from the peripheral portion of the keeper and locking cover elements so as to be protected from deformation through the use of prying instruments. With the wide peripheral stiffening flanges on the keeper and cover elements and their snug telescopic engagement, insertion of tools for separation of the elements will be frustrated. The rounded lip 23 on the keeper element provides for easy registration of the cover element for insertion of its flange into the keeper element flange. With the locking assembly in locking engagement on the wheel, the bolt structures 14 will be enclosed against access for removal of the wheel from its hub structure, and the outer end of the deflected part 25 of the locking cover element will be in front of the flange 17' on the cup 17 so that this cup cannot be removed for access to the spindle nut which secures the entire wheel structure to the vehicle axle.

A dust cap 42 is usually provided to enclose the locking assembly and is detachably secured as by spring clips 43 extending from the wheel disk.

I have shown a practical and efficient embodiment of the various features of my invention, but I do not desire to be limited to the exact construction, arrangement, and operation shown and described, as changes and modifications may be made without departing from the scope of the invention.

I claim as follows:

1. A locking assembly for an automobile wheel of the type disclosed, comprising a keeper element having bolt holes for receiving the bolts which secure the wheel to its hub structure and which has an outwardly extending flange surrounding the outer end of the hub structure, a locking cover element having an outwardly extending flange surrounding the flange on said keeper element, a ring secured to the inner side of said flange on the locking cover element and a ring secured to the outer side of the flange on said keeper element, said rings having tongues thereon adapted upon partial rotation of said locking cover element to lock said element axially to said keeper element, and lock structure between said elements operable to lock said locking cover element against reverse rotation to thereby hold said rings in interlocking engagement.

2. A locking assembly for an automobile wheel of the type disclosed, comprising a keeper element having bolt holes for receiving the bolts which secure the wheel to its hub structure and which has an outwardly extending flange surrounding the outer end of the hub structure, a locking cover element having an outwardly extending flange surrounding the flange on said keeper element, a ring secured to the inner side of said flange on the locking cover element and a ring secured to the outer side of the flange on said keeper element, said rings having tongues thereon adapted upon partial rotation of said locking cover element to lock said element axially to said keeper element, and lock structure between said elements operable to lock said locking cover element against reverse rotation to thereby hold said rings in interlocking engagement, said elements having peripheral flanges for intimate telescopic engagement.

3. A locking assembly for an automobile wheel of the type disclosed, comprising a sheet metal keeper element having holes for receiving the bolts which secure the wheel to its hub structure and having at its central portion an outwardly extending flange surrounding the outer end of the hub structure, a sheet metal locking cover element having its central portion deflected outwardly for surrounding the flange on said keeper element, a locking ring surrounding and secured to the flange on said keeper element and having outwardly extending locking tongues, a locking ring secured to the inner side of the forwardly deflected part on said locking cover element and having inwardly extending locking tongues, the tongues on said rings having extensions adapted upon partial rotation of said locking cover element to interlock to hold said element against axial outward movement, and lock structure accessible only from outside of said locking cover element for locking said element against reverse rotational movement.

4. A locking assembly for an automobile wheel of the type disclosed, comprising a sheet metal keeper element having holes for receiving the bolts which secure the wheel to its hub structure and having at its central portion an outwardly extending flange surrounding the outer end of the hub structure, a sheet metal locking cover element having its central portion deflected outwardly for surrounding the flange on said keeper element, a locking ring surrounding and secured to the flange on said keeper element and having outwardly extending locking tongues, a locking ring secured to the inner side of the forwardly deflected part on said locking cover element and having inwardly extending locking tongues, the tongues on said rings having extensions adapted upon partial rotation of said locking cover element to interlock to hold said element against axial outward movement, and lock structure accessible only from outside of said locking cover element for locking said element against reverse rotational movement, said keeper element having a peripheral comparatively wide outwardly extending flange and said locking cover element having a comparatively wide rearwardly extending peripheral flange for telescopically engaging the flange on the keeper element whereby said elements will form an enclosure for the wheel securing bolts and said lock structure.

5. A locking assembly for an automobile wheel of the type described, comprising an annular keeper member adapted to be secured to the wheel around the end of the wheel hub and having an outwardly extending inner flange surrounding the hub and an outwardly extending peripheral flange, an annular locking member having an outwardly extending inner flange for surrounding the inner flange on said keeper member and a peripheral inwardly extending flange for telescopic engagement with the peripheral flange on the keeper member, locking tongues on the inner flanges of said keeper member and locking member respectively adapted upon axial movement and then partial rotary movement of said locking member to interlock to lock said locking member against axial outward movement, and lock structure between said keeper member and said locking member for locking said locking member against reverse rotary movement.

6. A locking assembly for an automobile wheel of the type described, comprising an annular keeper disk adapted to be secured to the wheel to surround the outer end of the wheel hub and having an annular flange extending outwardly from its inner edge to surround the hub, an annular locking disk for extending in front of the wheel securing bolts and having an annular flange extending outwardly from its inner edge to surround the flange on said keeper disk, locking tongues on the outside of the flange on said keeper disk and locking tongues on the inner side of the flange on said locking disk adapted upon axial movement and then a partial rotary movement of said locking disk to enter into interlocking engagement to lock the locking disk against axial movement, and lock structure on the outer disk cooperable with the keeper disk to lock said locking disk against rotation tending to break the interlocking engagement of said tongues.

HERBERT S. JANDUS.